United States Patent
Ramani et al.

(10) Patent No.: US 6,773,691 B2
(45) Date of Patent: Aug. 10, 2004

(54) CONTROLLING SYNGAS $H_2$:CO RATIO BY CONTROLLING FEED HYDROCARBON COMPOSITION

(75) Inventors: Sriram Ramani, Ponca City, OK (US); Joe D. Allison, Ponca City, OK (US); Alfred E. Keller, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 10/196,028

(22) Filed: Jul. 16, 2002

(65) Prior Publication Data

US 2004/0013605 A1 Jan. 22, 2004

(51) Int. Cl.[7] ................................................. C01B 3/26
(52) U.S. Cl. .................... 423/651; 423/418.2; 252/373; 48/198.1; 48/198.7
(58) Field of Search .................... 252/373; 48/198.1, 48/198.7; 423/418.2, 651

(56) References Cited

U.S. PATENT DOCUMENTS 6,488,907 B1 * 12/2002 Barnes et al. ............ 423/418.2

OTHER PUBLICATIONS

Gunardson, Harold, *Industrial Gases in Petrochemical Processing*, pp. 41–88, Ch. 2 "Synthesis Gas Manufacture," Marcel Dekker, Inc. Pub. (1998).

Texaco—Brochure entitled "Texaco Gasification Process for Gaseous or Liquid Feedstocks" (Before Sep. 3, 1997).

Andrzej Cybulski and Jacob A. Moulijn eds., *Structured Catalysts and Reactors*, pp. 179–208, 599–615 (1998).

* cited by examiner

*Primary Examiner*—Stanley Silverman
*Assistant Examiner*—Maribel Medina
(74) *Attorney, Agent, or Firm*—Conley Rose, P.C.

(57) ABSTRACT

A method for generating syngas having a $H_2$:CO ratio of less than 2:1 including selecting a predetermined desired syngas $H_2$:CO molar ratio, selecting a hydrocarbon with a natural $H_2$:CO molar ratio less than the desired ratio, selecting a hydrocarbon with a natural $H_2$:CO molar ratio greater than the desired ratio, mixing the two hydrocarbons such that the natural $H_2$:CO molar ratio of the mixture is the desired ratio, and catalytically partially oxidizing the mixture to produce syngas with the desired ratio.

23 Claims, 1 Drawing Sheet

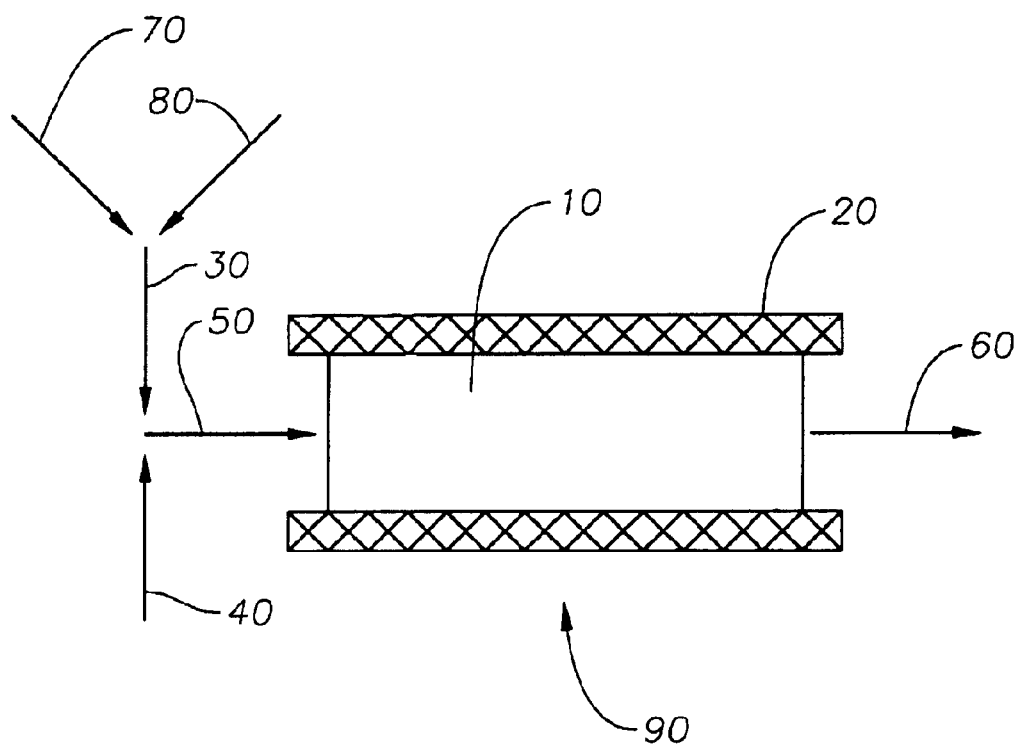

CONTROLLING SYNGAS H$_2$:CO RATIO BY CONTROLLING FEED HYDROCARBON COMPOSITION

RELATED APPLICATIONS

Not applicable.

STATEMENT REGARDING FEDERALLY SPONSORED RESEARCH OR DEVELOPMENT

Not applicable.

TECHNICAL FIELD OF THE INVENTION

The present invention relates to a process for the preparation of synthesis gas ("syngas"), i.e., a mixture of carbon monoxide and hydrogen, from natural gas. More particularly, the present invention relates to controlling the exit stream composition of a syngas reactor by controlling the feed hydrocarbon composition.

BACKGROUND

Large quantities of methane, the main component of natural gas, are available in many areas of the world. However, a significant portion of that natural gas is situated in areas that are geographically remote from population and industrial centers ("stranded gas"). The costs of compression, transportation, and storage often makes the use of stranded gas economically unattractive. Consequently, the stranded natural gas is often flared. Flaring not only wastes the energy content and any possible economic value the natural gas may have but may also create environmental concerns.

To improve the economics of natural gas transportation and utilization, much research has focused on using the methane component of natural gas as a starting material for the production of higher hydrocarbons and hydrocarbon liquids. The conversion of methane to higher hydrocarbons is typically carried out in two steps. In the first step, methane is reacted to produce carbon monoxide and hydrogen (i.e., synthesis gas or "syngas"). In a second step, the syngas is converted to higher hydrocarbon products by processes such as Fischer-Tropsch synthesis. For example, fuels with boiling points in the middle distillate range, such as kerosene and diesel fuel, and hydrocarbon waxes may be produced from the syngas. In addition, syngas may be used for the manufacture of ammonia, hydrogen, methanol, and other chemicals. Less traditional uses of syngas continue to be developed and have increased in importance in recent years, such as in the production of acetic acid and acetic anhydride manufacture. Among the promising new developments in syngas chemistry are routes to ethylene.

There are currently three primary methods for converting methane to syngas. Those methods include: steam reforming (the most widespread), dry reforming (also called CO$_2$ reforming), and partial oxidation. Steam reforming, dry reforming, and partial oxidation ideally proceed according to the following reactions respectively:

   (1)

   (2)

   (3)

For a general discussion of steam reforming, dry (or CO$_2$) reforming, and partial oxidation, please refer to HAROLD GUNARDSON, *Industrial Gases in Petrochemical Processing* 41–80 (1998), the contents of which are incorporated herein by reference.

Although a theoretical H$_2$:CO ratio can be calculated for any given reaction, relative amounts of hydrogen and carbon in a syngas product stream depend on many factors including the type of reaction, the process technology, the feedstock composition, and the reactor operating conditions. The theoretical ratio of hydrogen to carbon monoxide in the reactant stream of reactions 1, 2, and 3 can easily be calculated as 3:1, 2:2 (i.e., 1:1), and 2:1. The actual ratio of hydrogen to carbon monoxide in syngas product streams can range as low as 0.6 with CO$_2$ reforming of natural gas or partial oxidation of petroleum coke to as high as 6.5 with steam methane reforming. In addition, it has been noticed in GUNARDSON on pages 68–71 the actual molar ratio of H$_2$:CO in the product stream can vary depending upon the feedstock used.

There are many processes, such as the production of methanol, in which an H$_2$:CO molar ratio of about 2:1 is desired. There are also processes in which a molar ratio of hydrogen and carbon monoxide of less than 2:1 is preferable. One such process is hydroformylation, which is the addition of one molecule of carbon monoxide and one molecule of hydrogen to an olefin to make an aldehyde. The following reaction illustrates one of the simplest examples of hydroformylation:

   (4)

Hydroformylation is, inter alia, an intermediate step in both methyl methacrylate synthesis and the oxo process to produce alcohols. Additionally, there may be other processes in which an H$_2$:CO ratio of between 2:1 and about 1:1 is desirable.

As noted above, one method of producing syngas with a molar ratio of hydrogen to carbon monoxide of between about 2:1 and about 1:1 is by the partial oxidation of methane followed by the CO$_2$ reforming of methane. Unfortunately, CO$_2$ reforming is endothermic and requires external heating to drive the reaction, which increases the capital cost of CO$_2$ reforming. In addition, this scheme of partial oxidation followed by CO$_2$ reforming requires two reactors thereby also increasing the capital cost. Thus, in many situations, partial oxidation followed by CO$_2$ reforming may be economically or physically (or both) unfeasible or undesirable.

There is, therefore, a need for a less capital intensive process in which the H$_2$:CO molar ratio in the product stream can be varied and controlled between about 2:1 and about 1:1

SUMMARY OF THE PREFERRED EMBODIMENTS

The present invention provides a method for controlling the H$_2$:CO molar ratio between about 2:1 and about 1:1 in a syngas product stream by controlling the feed hydrocarbon composition.

An embodiment of the present method generally includes predetermining a desired syngas product stream H$_2$:CO molar ratio, selecting a hydrocarbon with an actual natural H$_2$:CO molar ratio greater than the desired molar ratio, selecting a hydrocarbon with an actual natural H$_2$:CO molar ratio less than the desired molar ratio, mixing the two hydrocarbons on-line such that the actual natural H$_2$:CO molar ratio of the mixture is equal to the desired molar ratio, and net catalytically partially oxidizing the mixture to produce syngas with the desired H$_2$:CO molar ratio.

It is also possible to control and vary the product stream composition by controlling and varying the feed stream composition.

BRIEF DESCRIPTION OF THE DRAWINGS

For a more detailed understanding of the present invention, reference is made to the accompanying FIGURE, which is a schematic cross sectional view of a first preferred embodiment of the present invention.

DETAILED DESCRIPTION OF THE PREFERRED EMBODIMENTS

The preferred reactor is a standard catalytic partial oxidation ("CPOX") reactor 90 comprising a refractory lining 20 and a CPOX catalyst system 10. The reactants for reactor 90 comprise oxygen-containing stream 40 and hydrocarbon feedstreams 70 and 80 which are combined to become feedstream 30. Streams 30 and 40 are mixed to become stream 50 which is introduced to catalyst system 10. After reacting in catalyst system 10, the stream exits reactor 90 as product stream 60. Definitions of terms of art used in this Detailed Description (e.g., "ideal natural $H_2$:CO ratio") are defined at the end of this Detailed Description.

Referring now to the catalyst system 10, any of a variety of well known catalysts containing various metals such as, by way of example only, Group VIII metals, iron, cobalt, nickel, ruthenium, rhodium, palladium, iridium, platinum, cerium, samarium, or combinations thereof may be used. These catalysts may be supported on a variety of supports such as, by way of example only, alumina, silica, magnesia, zirconia, yttria, calcium oxide, zinc ozide, perovskites, lanthanide oxides, partially stabilized zirconia, or combinations thereof. The catalyst supports may be configured in several ways as are known in the art such as, by way of example only, monoliths, pellets, pills, spheres, granules, gauze, particulates, beads, rings, or ceramic honeycomb structures or any other support as is known in the art. Preferably, gas hourly space velocity of the feed stream is great enough and the catalyst bed length is short enough such that the contact time of the feed stream with the catalyst is no more than about 200 ms or optionally, no more than about 10 ms. The bed length is preferably at least about ⅛ inch long and the gas hourly space velocity of feed gas across the bed is preferably about 1,000–10,000,000 NL/kg/hr, and more preferably about 20,000–6,000,000 NL/kg/hr.

In operation, the desired $H_2$:CO molar ratio for product stream 60 is predetermined for maximization of a downstream process (not shown). For purposes of this example only, the predetermined ratio will be 1.75:1. This desired ratio is achieved by controlling the composition of the feed stream 50 which in turn is achieved by controlling the composition and relative flow of hydrocarbon feed streams 70 and 80.

For purposes of this example and for simplicity's sake, ideal (rather than actual) natural $H_2$:CO ratios will be used for the hydrocarbon feed streams. It should be understood that in actual operation, the actual natural $H_2$:CO ratios for the actual reactor conditions should be used. It should also be understood that although the following calculations are done with pure feed streams, diluted feed streams may be used. If diluted feed streams are used, one of ordinary skill in the art can easily modify the flow rate of the diluted streams so that the amounts of the reactant hydrocarbons in the feed streams create the proper relative reactant gas proportions in the mixed feed stream.

In accordance with one embodiment of the present invention, hydrocarbon feed stream 70 is chosen to be methane $CH_4$ because its ideal natural $H_2$:CO ratio for CPOX is 2:1 (greater than the predetermined desired ratio). Hydrocarbon feed stream 80 is chosen to be ethane because its ideal natural $H_2$:CO ratio for CPOX is 1.5:1 (less than the predetermined desired ratio). Determining the proper relative flows of hydrocarbon feed streams 70 and 80 is done by adjusting the relative flows such that the weighted average of the ideal natural $H_2$:CO ratios is equal to the desired ratio. For a binary mixture such as this one (of methane and ethane), the proper ratio can be calculated by solving the following set of equations for x and y where C equals the desired $H_2$:CO ratio, A equals the natural $H_2$:CO ratio of stream 70 (e.g., 2), B equals the natural $H_2$:CO ratio of stream 80 (e.g., 1.5), x equals the percentage of the total combined molar flow of streams 70 and 80 of the component of stream 70, and y equals the percentage of the total combined molar flow of streams 70 and 80 of the component of stream 80:

$$Ax+By=C \quad (5)$$

$$x+y=1 \quad (6)$$

Solving Equations 5 and 6 for x and y for the current example, x=0.5 and y=0.5. Thus, in this example stream 70 and stream 80 should each have 50% of the combined molar flow of the two streams (70 plus 80). (i.e., both streams 70 and 80 should have equal molar flow rates of methane and ethane respectively).

The two feed streams 70 and 80 are then fed, along with oxygen containing stream 40, into a syngas reactor 90. The oxygen containing stream 40 is preferably substantially pure oxygen, but it may also comprise air or oxygen-enriched air.

In situations where there are greater than two hydrocarbon feed streams, the relative molar flow rates of the plurality of streams needed to achieve the desired product stream $H_2$:CO molar ratio can be calculated by solving the following set of equations for $x_1, x_2, \ldots x_n$.

$$A_1x_1+A_2x_2+\ldots A_nx_n=C \quad (7)$$

$$x_1+x_2+\ldots x_n=1 \quad (8)$$

In Equations 6 and 7, n is the number of hydrocarbon feed streams, $A_1, A_2, \ldots A_n$ are the natural $H_2$:CO ratios of the corresponding hydrocarbon feed streams, $x_1, x_2 \ldots x_n$ are the percentages of each respective hydrocarbon flow, and C is the desired product stream $H_2$:CO molar ratio. Unless there are other constraints, there will be multiple solutions to these equations. However, one of ordinary skill in the art can easily determine an acceptable ratio of hydrocarbon feeds based on factors such as, for example, feed cost, feed availability, and environmental concerns.

It was found that with a propane-oxygen feedstream, syngas was generated in high selectivity, with a small amount of $CO_2$. The operation was stable and $H_2$:CO ratio was about 1.3:1. With a methane-oxygen feed stream, these catalysts yield syngas with low $CO_2$ selectivity and $H_2$:CO ratio of about 1.8-2:1. From these observations, it is proposed that by varying and controlling the hydrocarbon composition in the feed, the $H_2$:CO ratio in the syngas product can be modified based on the desired use of the syngas. By using a selective and stable catalyst for syngas generation from a variety of hydrocarbons, a single-stage process can be designed for obtaining syngas with a $H_2$:CO ratio less than 2:1.

It is contemplated that in some instances it may happen that the actual natural $H_2$:CO ratio of a mixture may not equal the molar weighted average of the actual natural $H_2$:CO ratios of the components of the mixture due to differences in the chemical behavior of the mixture from the individual components. In this instance, the flow of the feed components can be adjusted to reach the desired $H_2$:CO ratio in the product stream. For example, if the actual $H_2$:CO ratio in the product stream is greater than desired, increasing the relative amount of the feed components with lower actual natural $H_2$:CO ratio should decrease the observed product stream $H_2$:CO ratio. The opposite should also be true (i.e., to raise the product stream $H_2$:CO ratio, increase the relative proportion of the higher actual natural $H_2$:CO ratio feed components).

EXAMPLES

Example 1

CPOX with Rh/Yb Catalyst

Procedure for Preparation of Rh/Yb/$ZrO_2$ Catalysts

The Rh-Yb catalyst supported on Zirconia granules can be prepared according to the following procedure, given here for laboratory-scale batches:

1. Dissolve 0.5476 grams of $Yb(NO_3)_3 \cdot 5H_2O$ in 3 grams of distilled and de-ionized (DDI) water at about 70° C. on the hotplate. Add this solution to $ZrO_2$ granules (35–50 mesh, 10.20 grams, 1100° C.-calcined).

2. Dry the material at about 70° C. for 1 hour and calcine in air according to the following schedule: 5° C./min ramp up to 125° C.; hold at 125° C. for 1 hour; 5° C./min ramp up to 400° C.; hold at 400° C. for 1 hour; 5° C./min ramp up to 800° C.; hold at 800° C. for 1 hour; 5° C./min ramp up to 1000° C.; hold at 1000° C. for 3 hours; 10° C./min ramp down to room temperature.

3. The above procedure should result in 2 wt % Yb based on the weight of $ZrO_2$ granules.

4. Dissolve 0.9947 grams of $RhCl_3 \cdot xH_2O$ in 3 grams of DDI water at about 60° C. and add to the $Yb_2O_3$-coated $ZrO_2$ granules at about 70° C.

5. Dry the material at about 70° C. for 1 hour and calcine in air according to the following schedule: 5° C./min ramp up to 125° C.; hold at 125° C. for 1 hour; 5° C./min ramp up to 400° C.; hold at 400° C. for 1 hour; 5° C./min ramp up to 800° C.; hold at 800° C. for 1 hour; 5° C./min ramp up to 1000° C.; hold at 1000° C. for 3 hours; 10° C./min ramp down to room temperature.

6. The above procedure should result in 4 wt % Rh based on the weight of $ZrO_2$ granules.

7. Reduce the catalyst with $H_2$ using 1:1 by volume flow of $N_2$:$H_2$ mixture at 0.3 standard liter per minute (SLPM) measured at 0° C. and 1 atm pressure, using the following schedule: 3° C./min ramp up to 125° C.; hold at 125° C. for 0.5 hour; 3° C./min ramp up to 500° C.; hold at 500° C. for 3 hours; 5° C./min ramp down to room temperature.

Test Procedure

The partial oxidation reactions are carried out in a conventional flow apparatus using a 44 mm O.D.×38 mm I.D. quartz insert embedded inside a refractory-lined steel vessel. The quartz insert contains a catalyst bed containing the Rh/Yb/$ZrO_2$ catalyst as prepared above. Preheating the hydrocarbon feed that flows through the catalyst bed provides the heat needed to initiate the reaction. Oxygen is mixed with the hydrocarbon feed stream immediately before the mixture enters the catalyst bed. Once the reaction is initiated, it proceeded autothermally. Two thermocouples with ceramic sheaths are used to measure catalyst inlet and outlet temperatures. The molar ratio of feed hydrocarbon to $O_2$ is generally about 2:1, however the relative amounts of the gases, the catalyst inlet temperature and the reactant gas pressure can be varied by the operator according to the parameters being evaluated (see the following Tables). The product gas mixture is analyzed for the feed hydrocarbons, $O_2$, CO, $H_2$, $CO_2$ and $N_2$ using a gas chromatograph equipped with a thermal conductivity detector. A gas chromatograph equipped with a flame ionization detector analyzes the gas mixture for $CH_4$, $C_2H_6$, $C_2H_4$ and $C_2H_2$. The feed hydrocarbon conversion levels and the CO and $H_2$ product selectivities obtained are considered predictive of the conversion and selectivities that will be obtained when the same catalyst is employed in a commercial scale reactor under similar conditions of reactant concentrations, temperature, reactant gas pressure and space velocity.

The following test data were obtained at a total feed flowrate of 3.5 SLPM at a preheat temperature of 3000° C. and hydrocarbon:oxygen molar ratio of 2:1.

| Feed Hydrocarbons | Feed molar ratio | H2:CO molar ratio |
|---|---|---|
| $CH_4$ | $CH_4$:$O_2$ = 2:1 | 2.04 |
| $CH_4$, $C_2H_6$ | $CH_4$:$C_2H_6$:$O_2$ = 1:1:1 | 1.74 |
| $C_2H_6$ | $C_2H_6$:$O_2$ = 2:1 | 1.67 |
| $C_2H_6$, $C_3H_8$ | $C_2H_6$:$C_3H_8$:$O_2$ = 1:1:1 | 1.56 |
| $CH_4$, $C_3H_8$ | $CH_4$:$C_3H_8$:$O_2$ = 1:1:1 | 1.50 |
| $C_3H_8$ | $C_3H_8$:$O_2$ = 2:1 | 1.46 |

The results shown above clearly indicate the effect of feed hydrocarbon composition on the product hydrocarbon:carbon monoxide ratio (referred to as 'syngas ratio'). By mixing hydrocarbons with different carbon numbers, a wide range of syngas ratios can be obtained, without modifying the process conditions. All of the above reactions occur under the same preheat temperature range, flow rates and heat transfer rates, so there is no need for design changes.

For purposes of this specification, the following definitions shall apply.

The term "catalyst system" as used herein means any acceptable system for catalyzing the desired reaction in the reaction zone. By way of example only, the catalyst system of a syngas steam reforming reaction usually includes a support and a catalyst. Acceptable supports include, for example, particulates, pills, beads, granules, pellets, monoliths, ceramic honeycomb structures, wire gauze, or any other suitable supports such as those listed herein. Likewise, The catalyst may be selected from the group consisting of nickel, samarium, rhodium, cobalt, platinum, rhodium-samarium, platinum-rhodium Ni—MgO, combinations thereof, or any other catalysts as is well known in the art such as those cited herein. The above-exemplified examples of supports and catalysts are only examples. There are a plethora of catalysts systems known in the art which would be acceptable and are contemplated to fall within the scope, such as those disclosed in STRUCTURED CATALYSTS AND REACTORS 179–208, 599–615 (Andrzej Cybulski and Jacob A. Moulijn eds. 1998) incorporated herein by reference for all purposes.

The term "natural $H_2$:CO ratio" shall mean the $H_2$:CO ratio expected to be present in the product stream of the net partial oxidation of a feed stream.

The "ideal natural $H_2$:CO ratio" is the $H_2$:CO ratio predicted by the basic partial oxidation reaction. For example, the basic partial oxidation reaction for methane ($CH_4$) is:

$$CH_4 + \tfrac{1}{2}O_2 \rightarrow CO + 2H_2 \qquad (3)$$

The $H_2$:CO ratio in the product of that reaction is 2:1. The generalized partial oxidation reaction for alkanes is:

$$C_nH_{(2n+2)} + (n/2)O_2 \rightarrow nCO + (n+1)H_2 \quad (9)$$

Thus, the ideal natural $H_2$:CO ratio of an alkane is $[(n+1)/n]$:1. The reaction for the partial oxidation of any hydrocarbon consisting of only carbon and hydrogen (e.g., isobutane) can easily be determined by one of ordinary skill in the art by balancing the equation:

$$aHC + bO_2 \rightarrow cCO + dH_2 \quad (10)$$

where HC is the molecular formula of the hydrocarbon and a, b, c, and d are the stoichiometric coefficients that balance the equation. In Equation 10, the ideal natural $H_2$:CO ratio for HC is (d/c): 1.

The "actual natural $H_2$:CO ratio" of a feed stream is the $H_2$:CO ratio observed in the product stream of the net partial oxidation of a given feed stream under given reactor conditions. It may differ from the ideal natural $H_2$:CO ratio because of side reactions or adverse reactor conditions. For example, the actual natural $H_2$:CO ratio of a methane feed is often measured to be approximately 1.8:1 due to the existence of secondary reactions and may vary with variations in reactor conditions and catalyst systems. While the example discussed above uses the ideal natural $H_2$:CO ratios for methane and ethane for the calculation, the calculations are performed exactly the same using the actual natural $H_2$:CO ratio (i.e., the $H_2$:CO ratio of the product stream is controlled by controlling the weighted average of the actual natural $H_2$:CO ratios of the hydrocarbon feed streams).

For the purposes of this disclosure, the term "net partial oxidation reaction" means that the partial oxidation reaction shown in Equation (3), above, predominates. However, other reactions such as steam reforming (Equation 1), dry reforming (Equation (2)) and/or water-gas shift (Equation (11)) may also occur to a lesser extent.

$$CH_4 + CO_2 \leftrightharpoons 2CO + 2H_2 \quad (2)$$

$$CO + H_2O \leftrightharpoons CO_2 + H_2 \quad (11)$$

The actual natural $H_2$:CO ratio resulting from the catalytic net partial oxidation of the methane, or natural gas, and oxygen feed mixture is about 2:1, similar to the ideal natural $H_2$:CO ratio of Equation (3).

Without further elaboration, it is believed that one skilled in the art can, using the description herein, utilize the present invention to its fullest extent. The embodiments herein are to be construed as illustrative, and not as constraining the remainder of the disclosure in any way whatsoever.

What is claimed is:

1. A method for producing a syngas product stream with an $H_2$:CO molar ratio of a predetermined desired molar ratio less than about 2:1, the method comprising:

providing a methane source;

providing a higher hydrocarbon source;

providing an oxygen source;

providing a partial oxidation reactor;

calculating a desired feed ratio of the methane and the higher hydrocarbon;

mixing the methane and the higher hydrocarbon in the desired feed ratio to create a hydrocarbon mixture;

partially oxidizing the mixture in the partial oxidation reactor to produce a syngas stream with a hydrogen to carbon monoxide molar ratio substantially equal to the predetermined desired molar ratio.

2. A method for producing a syngas product stream with a predetermined $H_2$:CO molar ratio, the method comprising:

providing a first hydrocarbon source with an actual natural $H_2$:CO molar ratio of greater than the predetermined $H_2$:CO ratio;

providing a second hydrocarbon source with an actual natural $H_2$:CO molar ratio of less than the predetermined $H_2$:CO ratio;

providing an oxygen source;

mixing the first hydrocarbon source and the second hydrocarbon source into a mixed feed stream in such proportions such that an expected actual natural $H_2$:CO molar ratio of the mixed feed stream is substantially equal to the predetermined $H_2$:CO molar ratio; and partially oxidizing the mixed feed stream in a partial oxidation reactor to produce a product stream;

wherein the $H_2$:CO molar ratio of the product stream is substantially equal to the predetermined $H_2$:CO molar ratio.

3. The method of claim 2 wherein the first hydrocarbon source comprises primarily methane.

4. The method of claim 2 wherein the first hydrocarbon source comprises natural gas.

5. The method of claim 2 wherein the oxygen source comprises air, oxygen-enriched air, or substantially pure oxygen.

6. The method of claim 2 wherein the partial oxidation reactor comprises a catalyst material supported on a support material.

7. The method of claim 6 wherein the catalyst material comprises a Group VIII metal, iron, nickel, cobalt, ruthenium, rhodium, palladium, iridium, platinum, cerium, samarium, or combinations thereof.

8. The method of claim 6 wherein the catalyst material comprises rhodium.

9. The method of claim 6 wherein the support material comprises granules.

10. The method of claim 6 wherein the support material is a monolithic support.

11. The method of claim 6 wherein a contact time of the mixed feed stream with the supported catalyst material is no more than about 200 ms.

12. The method of claim 11 wherein the contact time of the mixed feed stream with the supported catalyst material is no more than about 10 ms.

13. A method for controlling the $H_2$:CO molar ratio in a syngas product stream, the method comprising;

predetermining a desired product stream $H_2$:CO molar ratio;

providing a first hydrocarbon source with an actual natural $H_2$:CO molar ratio less than the desired product stream $H_2$:CO molar ratio;

providing a second hydrocarbon source with an actual natural $H_2$:CO molar ratio greater than the desired product stream $H_2$:CO molar ratio;

calculating the relative proportions of the first and second hydrocarbon sources needed to produce a mixture with an expected actual natural $H_2$:CO molar ratio substantially equal to the desired product stream $H_2$:CO molar ratio;

mixing the first and second sources in the calculated relative proportions to produce a mixture;

net partially oxidizing the mixture to produce a product stream;

measuring the $H_2$:CO molar ratio in the product stream;

adjusting the relative proportions of the first and second hydrocarbon sources, if necessary, until the product stream $H_2$:CO molar ratio is substantially equal to the desired product stream $H_2$:CO molar ratio.

14. The method of claim 13 wherein the first hydrocarbon source comprises primarily methane.

15. The method of claim 13 wherein the first hydrocarbon source comprises natural gas.

16. The method of claim 13 wherein the oxygen source comprises air, oxygen-enriched air, or substantially pure oxygen.

17. The method of claim 13 wherein the partial oxidation reactor comprises a catalyst material supported on a support material.

18. The method of claim 17 wherein the catalyst comprises rhodium.

19. The method of claim 17 wherein the catalyst material comprises a Group VIII metal, iron, cobalt, nickel, ruthenium, rhodium, palladium, iridium, platinum, cerium, samarium, or combinations thereof.

20. The method of claim 17 wherein the support material comprises granules.

21. The method of claim 17 wherein the support material is a monolithic support.

22. The method of claim 17 wherein a contact time of the mixed feed stream with the supported catalyst material is no more than about 200 ms.

23. The method of claim 17 wherein a contact time of the mixed feed stream with the supported catalyst material is no more than about 10 ms.

* * * * *